May 31, 1960
L. BUCALO
2,938,409
MOTIVE MEANS HAVING LOW SPEED OUTPUT
Filed Oct. 25, 1954
2 Sheets-Sheet 1
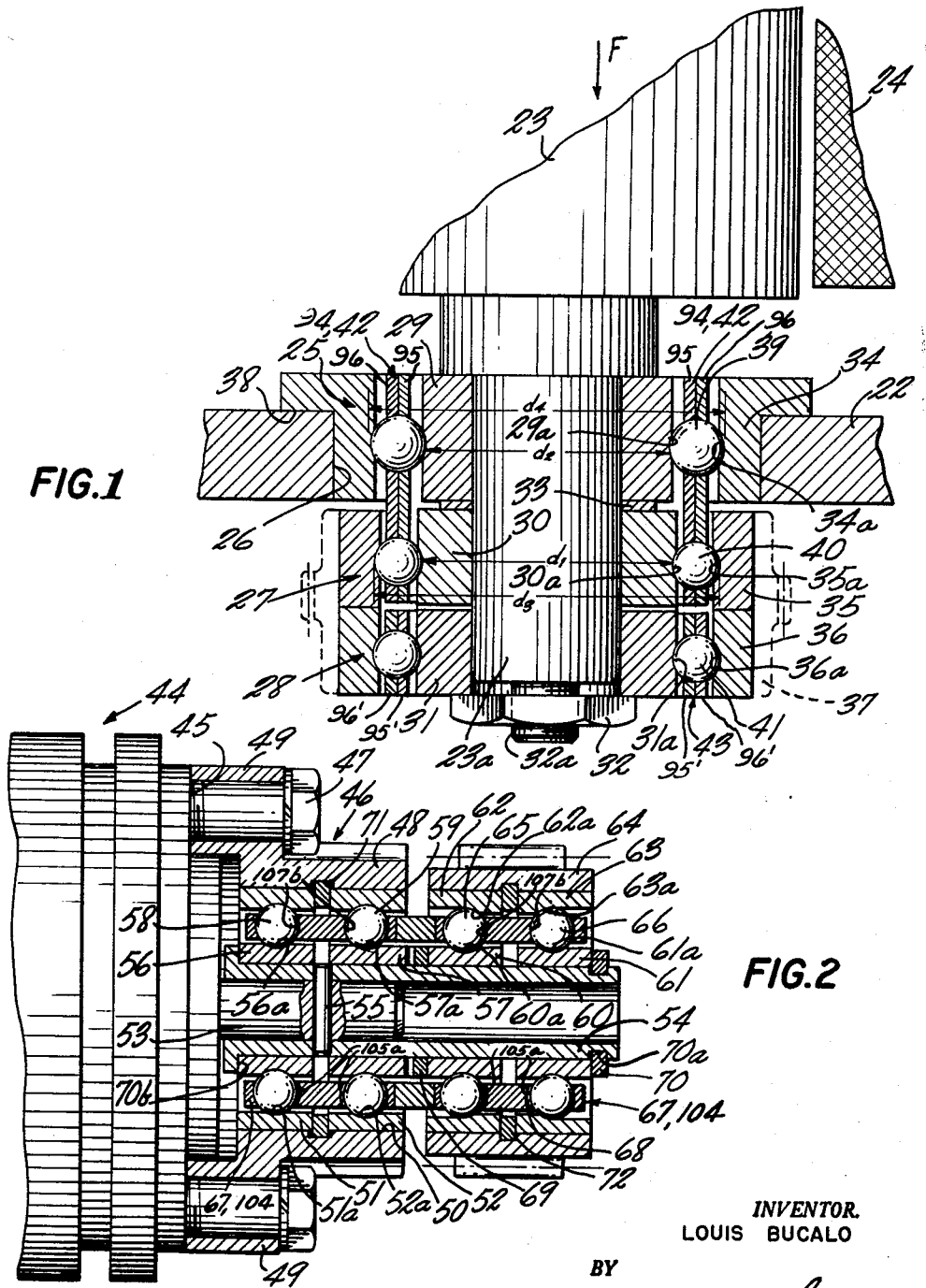
INVENTOR.
LOUIS BUCALO
BY
John C. McBryn
his ATTORNEY May 31, 1960 L. BUCALO 2,938,409
MOTIVE MEANS HAVING LOW SPEED OUTPUT
Filed Oct. 25, 1954 2 Sheets-Sheet 2
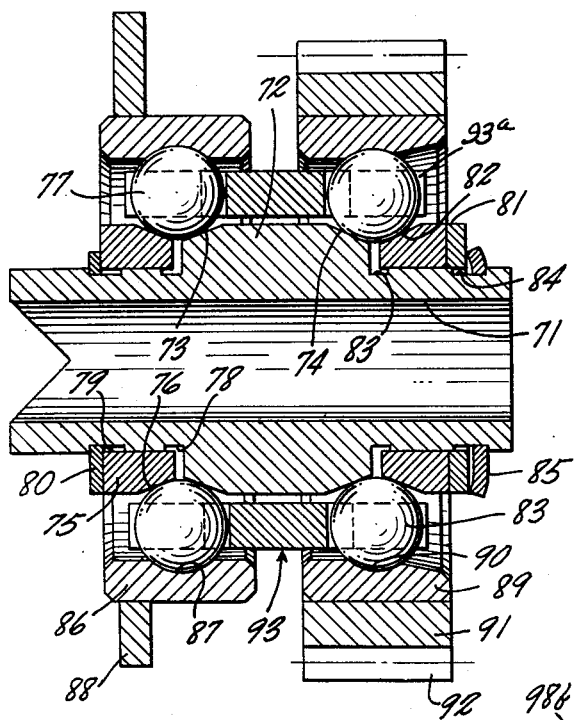
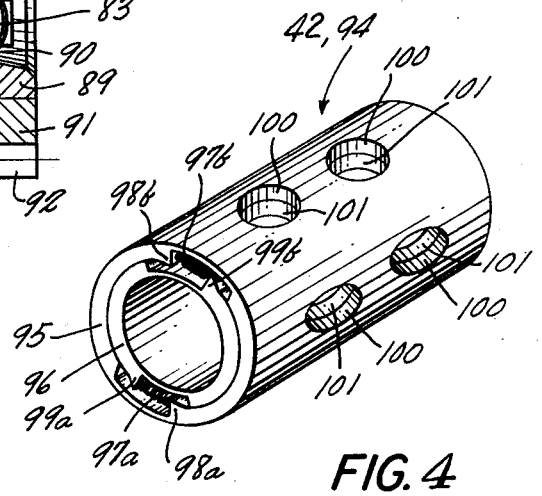
INVENTOR.
LOUIS BUCALO
BY
John C. McGrgr
ATTORNEY.

United States Patent Office 2,938,409
Patented May 31, 1960

2,938,409

MOTIVE MEANS HAVING LOW SPEED OUTPUT

Louis Bucalo, Holbrook, N.Y., assignor to Specialties, Inc., Syosset, N.Y., a corporation of New York Filed Oct. 25, 1954, Ser. No. 464,575

3 Claims. (Cl. 74—798)

This invention relates to motive means and in particular to precision rotary equipment involving angular speed reductions.

Present day engineering practices have created a widespread need for self powered low speed rotary driving units for use, for example, in measuring, control and compensating devices, or, broadly speaking in servomechanisms. Electric motors are the most common power sources for servomechanisms and, because small, extremely low speed motors are not available, complex precision gearing is used to effect the speed reduction to provide the necessary low speed output.

The precision gearing which is commonly used for this purpose is expensive; it requires careful use to prevent self-destruction due to overloading; and it can be a source of relatively large errors because of backlash.

Accordingly, it is one object of the present invention to provide motive means having an extremely low turning velocity in the output shaft.

Another object is to provide motive means including rotary bearing and speed reducing mechanism which is inexpensive, efficient and quiet in its operation.

Another object is to provide motive means including rotary bearing and speed reducing mechanism affording very low angular velocity in the output, which is robust in construction and which protects itself against damage when overloaded.

Another object is to provide mechanism for achieving high ratios of speed reduction relatively free of backlash.

Another object of the invention is to provide speed reduction means which is low in inertia and subminiature in size.

Another object of the invention is to provide an irreversible drive which is of value in driving unstable loads.

Another object is to provide the above features in a transfer mechanism.

Yet another object is to provide mechanism capable of converting high speed rotary motion to low speed rotary motion and at the same time serving as a bearing for both input and output shafts.

These and other objects and features may be attained in accordance with the present invention by means including an electric motor having its rotor journalled in a multiple ball bearing assembly, certain of the plural races and ball cages of which are positively driven by the rotor at the same angular speed, others of which are interconnected to turn as one, and still others of which are controlled to afford an output motion having a resultant turning component which is but a fraction of that of the rotor. Thus the ball bearing assembly serves to carry the rotor, to reduce the speed of the rotor radically and to carry the output shaft.

The invention and several representative embodiments thereof are described below, taken in conjunction with the accompanying drawings in which:

Figure 1 is a view partly in longitudinal section and partly in elevation, of a drive unit for providing extremely low turning velocity in the output;

Figure 2 is a view partly in longitudinal section and partly in elevation, of another form of drive unit;

Figure 3 is a view in longitudinal section through a portion of yet another form of drive unit;

Figure 4 is a view in perspective of a cage assembly adapted to be used in the drive units of Figure 1–3, and Figure 5 is a view in transverse section of a different form of cage adapted to be used in the drive units of Figures 1–3.

Referring to Figure 1, a low speed self actuated drive unit is shown including a housing 22 in which are mounted propulsion parts including a rotor 23 and a stator winding 24. The rotor 23 is journalled in bearing means, including a ball bearing assembly 25, secured to the housing 22 in an opening 26. The shaft 23 is formed with a necked-down portion 23a received in the bearing 25 and extending therethrough to carry second and third bearing assemblies 27 and 28, the latter two being separated from the first by a spacer 33.

The bearing assemblies 25, 27 and 28 include inner sleeve or race members 29, 30 and 31, respectively, fixed to the rotor 23 by a nut 32 screwed on to a threaded shaft tip 32a to jam the members against the shoulder of the necked-down portion 23a. The cylindrical outer faces of the race members 29, 30 and 31 are formed respectively with races 29a, 30a, and 31a, which can take the form of rounded grooves. The bearing assemblies also include outer sleeves or race members 34, 35 and 36, having cylindrical inner faces formed respectively with races 34a, 35a and 36a, rounded in conformance with the races 29a, 30a and 31a which they respectively oppose. The races 29a, 30a, 31a, 34a, 35a and 36a can be formed to present cross sections in the shape of a truncated cone or a V.

The race members 30 and 31 are joined together as one as by mounting within an output connector in the form of a pinion 37, for example, and they are free to rotate about the axis of the rotor. The race member 34 is restricted in its turning motion by virtue of its attachment to the housing 22. The mounting of the race member 34 in the housing is such that it can withstand axial thrust and to this end it can be furnished with a mounting shoulder 38.

Rings of balls 39, 40 and 41 are mounted respectively between the races 29a—34a, 30a—35a and 31a—36a, with the balls 39 and 40 being mounted in a common or double cage 42 and the balls 41 in a cage 43. The cages 42 and 43 are free to turn relatively to each other and to the other bearing parts and the balls are freely rotatable about their own axes in the respective cages. Thus the balls can rotate and revolve. The retainers 42 and 43 are each formed of a pair of concentric sleeves 95 and 96 and 95' and 96' which are relatively rotatable under the force of a spring (Figure 4) so that wear, which would normally cause backlash, is eliminated, all as described more fully below having reference to Figure 4. A thrust load can be applied on the rotor 23 in the direction indicated by the arrow F from a spring loaded rear journal bearing (not shown).

In accordance with the invention, the diameter, measured from the base of the grooves, of at least two corresponding races of the respective assemblies are slightly different, having a variation which can be, for example, in the vicinity of .010 inch. The diameter $d_1$ of the race 30a, for example, can exceed or be exceeded by the diameter $d_2$ of the race 29a, by this amount. In addition, or alternatively, the diameter $d_3$ of the race 35a can exceed or be exceeded by the diameter $d_4$ of the race 34a. The relative sizes of the balls 39 and 40 can differ, if the race diameters require it, or they can be the same.

The angular velocity of the output pinion 37, for any given angular velocity of the input shaft, can be established, by appropriate selection of values $d_1$, $d_2$, $d_3$, and $d_4$, at values greater than zero (rotation in the same direction as the input shaft), exactly zero, or less than zero (rotation countering that of the input shaft). Any combination of $$\frac{d_3}{d_1} \times \frac{d_2}{d_4}$$

which is close to unity will result in extremely high speed reductions, with reductions of the order of, say, 400 to 1, being easily attainable. In practice, it has been found that equivalent bearings made by different manufacturers tend to have slightly different race diameter ratios and very high speed reductions can be attained by using selected pairs of bearing assemblies without alteration of the races. It will be understood, however, that machining operations can be performed as required to achieve specific reductions.

In operation the high speed rotation which inheres in the rotor 23 will cause each of the inner race members 29, 30 and 31 to turn at the same angular speed. This will cause the balls 39 to rotate, and since the outer race member 34 is immobilized by the housing 22, the balls will cycle around the race 34a causing the cage 42 to rotate about the axis of the rotor 23. The rotating cage 42 will carry the ring of balls 40 with it and they will roll, assuming a difference in race diameters as described above, which makes $$\frac{d_1}{d_2} \neq \frac{d_3}{d_4}$$

A resultant motion will appear in the race member 35 as a slow rotation. The race member 36 of the bearing assembly 28 and the output pinion 37 will be driven by the race member 35. The bearing assembly 28 is essentially a means of loading the bearing assembly 27. Of course, the cage 43 can be made integral with or coupled to the cage 42 to increase the load capacity, in which case the race member 36 will also become a driving member. In the latter arrangement, however, the dimensional relationships between the bearing assemblies 27 and 28 must be precisely identical to prevent binding which would cause slippage and unnecessary wear.

It will be understood that the output pinion 37 can find an ultimate bearing in the housing 22 through the bearing assembly 25 so that no additional bearing support is needed for the output which can then take the form of a compact, quite low-speed drive unit which is substantially free of backlash notwithstanding a ratio of speed reduction as high as many hundreds to one. Thus the bearing assembly 25 performs the manifold functions of supporting the rotor, effecting a speed reduction, and supporting the output driver.

In the event the loading on the output becomes so severe that breakage would ordinarily occur, slipping will take place and the mechanism will be saved. In the normal course of operation, however, adequate output torques may be obtained without any slipping whatsoever.

In the arrangement of Figure 2 there is shown a ball bearing and speed reducing unit particularly adaptable for attachment to existing, conventional electric motors. The motor 44 has its face or end plate 45 tapped so that a unit 46, formed in accordance with the present invention, can be attached as by bolts 47. The unit 46 can include a stationary housing section 48 formed with a flange 49 bored to receive the bolts 47.

The housing section 48 is formed with an inner cylindrical surface 50 into which are fitted a pair of outer race members 51 and 52 internally grooved to form races 51a and 52a. The race members 51 and 52 are fixedly attached to the housing section 48 so as to be immobilized thereby and separated by a spacer 71.

Fitted over the drive shaft 53 of the motor 44 is an elongated sleeve 54. The sleeve is coupled to the shaft so that they turn together by means such for example as a pin 55. Coaxially fitted on the sleeve 54 to turn therewith and disposed concentrically within the fixed outer race members 51 and 52 are a pair of inner race members 56 and 57 externally grooved to form races 56a and 57a opposing the races 51a and 52a, respectively, to receive rings of balls 58 and 59.

Also carried by the sleeve 54 in fixed coaxial relationship therewith are a second pair of race members 60 and 61 externally grooved to form races 60a and 61a. Surrounding the inner race members 60 and 61 are a pair of outer race members 62 and 63 separated axially by a spacer 72 and respectively formed with races 62a and 63a. The race members 62 and 63 are joined together and to an output pinion 64 within which they are mounted. Rings of balls 65 and 66 are received in the races 60a—62a and 61a—63a, respectively.

All four of the rings of balls 58, 59, 65 and 66 are mounted in a common cage unit 67 which is free to rotate about the axis of the sleeve 54. The balls are received in openings formed in the cage or retainer unit 67. In order to prevent or reduce backlash, alternate ball-receiving holes, progressing circumferentially about the cage, are enlarged to loosely receive the balls and reduced to tightly receive the balls. In the arrangement of Figure 2 the balls at the top of the figure are illustrated as tightly fitted in openings 107b and the lower row of balls are loosely received in enlarged openings 105a. This arrangement of alternately closely fitted and loosely fitted bearing balls is illustrated more completely in Figure 5 and described in detail below. A snap ring 70 received in a recess 70a at the outer end of the sleeve bears against the right hand race member 61 and a shoulder 70b formed on the inner end of the sleeve 54 bears against the left hand race member 54 to hold the assembly in place. A spring 69 loads the race members axially to maintain the clamping forces.

As in the arrangement of Figure 1 described above, the dimensioning of the race diameters is such that a slight variation exists so that upon speed rotation of the shaft 53 and sleeve 54 an extremely low speed of rotation will appear at the output member 64. For proper action, the bearing assemblies including the rings of balls 58 and 59 should be dimensionally identical in their race diameters, as should the assemblies including the rings of balls 65 and 66.

It will be understood that in certain cases the ball shape can be modified somewhat by using sections of balls. Also, the multiple ball bearing assemblies can be fitted one within the other, in which case slightly lower speed reductions result.

Referring to Figure 3, a portion of a drive unit is shown in which the respective inner races for the balls are split and spring loaded as a means for compensating for wear. In the arrangement of Figure 4 a drive shaft 71 is formed on its outer surface with an enlarged portion or shoulder 72 having a bevelled or tapered surfaces 73 and 74. Mounted on the shaft 71 for limited axial movement adjacent the surface 73 is a race part 75 which can take the form of a ring having a bevelled or tapered surface 76, which together with the surface 73 forms a race for a ring of bearing balls 77. The portion of the shaft on which the race part 75 is mounted is grooved or undercut at 78 and 79 and interposed between the race part 75 and one edge of the groove 79 is a spring member 80 which can take the form of a bowed ring. Mounted adjacent to the bevelled surface 74 for limited axial sliding movement on the shaft 71 is a race part or ring 81 having a bevelled or tapered surface 82 which, together with the opposing surface 74 forms an inner race for a second ring of bearing balls 83. The shaft 71 near either edge of the ring 81 is formed with grooves 83 and 84, with a spring member 85 being received in the groove 84 to bear inwardly against the race part 81. In this fashion constant compensations for wear in the bearing parts are made and tight couplings are maintained at all times.

Surrounding the ring of balls 77 is an outer race member 86, the inner surface of which is formed with a race 87, which can take the form of a shallow, rounded groove for example. The outer race member 86 can have attached thereto a retaining ring 88 by means of which it can be immobilized as by bolting to the frame of an electric motor for example. Surrounding the ring of balls 83 is a race member 89 having formed on its inner surface a race 90. Fixed to the outer surface of the race member 89 is a gear 91 formed on its external surface with teeth 92.

The two rings of balls 77 and 83 are held in a common cage 93 so that as the shaft 71 is rotated at high speed and the race member 86 held immobilized, an extremely low angular velocity will occur in the gear 91, assuming diameter ratios as described above. As can be seen in the drawing, the cage 93 includes fingers 93a which project between adjacent balls to grip the balls laterally. As in the arrangement of Figures 2 and 5, the fingers 93a can be made to define ball-receiving openings of tight and loose fit, all as described in connection with Figure 5.

Between the opposed shoulder, the sleeves can be recessed or hollowed out to accommodate the springs.

In accordance with the invention, the cages of any of the drive mechanisms described above can be spring loaded to compensate for wear and to prevent backlash much the same as the races can be compensated by the spring loading 85 described above. Referring to Figure 4, for example, there is shown a ball bearing cage 94 which can take the form of a pair of concentrically mounted sleeves 95 and 96 which are free to turn angularly with respect to one another. The two cage parts 95 and 96 can be spring biased to turn one within the other by means of compression springs 97a and 97b, the former reacting between a pair of shoulders 98a and 99a formed on the sleeves 95 and 96 respectively and the latter reacting between a pair of opposing shoulders 98b and 99b, also formed respectively on the sleeves 95 and 96.

The two sleeves 95 and 96 are formed with a series of aligned, paired apertures 100 and 101, respectively, circularly arrayed in two rows to receive two sets or rings of balls (not shown). In order to accommodate the balls, the edge surfaces of the apertures can be rounded to accommodate the curvature of the balls. As wear occurs in the cage assembly, due to friction between the balls and the cage, the compression springs 97a and 97b will serve to counter-rotate the two sleeve parts, thereby to compensate for wear either in the balls or in the cage parts or in both. It will be understood that the cage assembly of Figure 4 can be used in any of the speed reduction drives described above.

Referring to Figure 5 there is shown a cage which effectively prevents backlash but which is very economical to manufacture.

In this arrangement a ball cage 104, of nylon, for example, can be formed with a first series of angularly arrayed ball-receiving apertures 105a, 105b and 105c which are larger than balls 106 received therein and which can therefore be formed with generous tolerances. Between the apertures 105a, 105b and 105c are apertures 107a, 107b and 107c which are drilled to close tolerances to receive the balls 106 in a tight working fit. Being relatively widely spaced, the apertures 107a, 107b and 107c can be more easily held to close tolerances.

All of the balls operate between the races to carry the working load and to transfer motion. However, those balls which are received in the apertures 105a, 105b and 105c serve in addition to constrain the cage against unauthorized motion. Thus backlash is prevented without necessitating the costly practice of holding close tolerances throughout. Moreover, a speed reducing unit embodying this arrangement turns more freely.

It follows that the specific embodiments of the invention disclosed herein are susceptible of numerous modifications in form and detail and that, therefore, the invention should not be regarded as limited except as defined by the following claims.

I claim:

1. In a rotary bearing and speed reducing unit, in combination, first and second coaxially arranged bearing assemblies, each assembly having bearing parts including an inner race, an outer race, each of said races having aligned grooves on their oppositely disposed faces, and a cage portion between the race; a series of balls in the respective cages to engage the corresponding races running in the channel formed by said grooves, input means for turning two corresponding parts of the respective bearing assemblies as one; means connecting two other corresponding bearing parts together to turn as one relatively to the input parts, means restricting the turning motion of the third bearing part of one of said bearing assemblies, at least two corresponding races of respective bearing assemblies having different diameters, whereby the input turning motion is reduced to low speed angular output motion, the cage portion of each bearing assembly comprising concentrically arranged sleeves mounted for relative rotation, each sleeve having a series of ball receiving apertures, corresponding apertures of each sleeve being adapted to be brought in to register to receive the balls, and means to turn the sleeves in opposite directions.

2. In a rotary bearing and speed reducing unit, in combination, first and second coaxially arranged bearing assemblies, each assembly having bearing parts including an inner race, an outer race, each of said races having aligned grooves on their oppositely disposed faces, and a cage portion between the races; a series of balls in the respective cages to engage the corresponding races running in the channel formed by said grooves, input means for turning two corresponding parts of the respective bearing assemblies as one; means connecting two other corresponding bearing parts together to turn as one relatively to the input parts, means restricting the turning motion of the third bearing part of one of said bearing assemblies; at least two corresponding races of respective bearing assemblies having different diameters, whereby the input turning motion is reduced to low speed angular output motion, the inner race of each bearing assembly being comprised of two parts having oppositely inclined surfaces defining cooperatively a ball race, means to mount the two race parts of each assembly for relative axial movement, and common spring means to urge the two parts of each bearing assembly axially toward each other, said output means comprising a cylinder attached to the third part of the said one assembly and a plurality of gear teeth attached to a face of said cylinder.

3. In a rotary bearing and speed reducing unit, in combination, first and second coaxially arranged bearing assemblies, each assembly having bearing parts including an inner race, an outer race, each of said races having aligned grooves on their oppositely disposed faces, and a cage portion between the races; a series of balls in the respective cages to engage the corresponding races running in the channel formed by said grooves, input means for turning two corresponding parts of the respective bearing assemblies as one; means connecting two other corresponding bearing parts together to turn as one relatively to the input parts, means restricting the turning motion of the third bearing part of one of said bearing assemblies; at least two corresponding races of respective bearing assemblies having different diameters, whereby the input turning motion is reduced to low speed angular output motion, the cage portion of each bearing assembly comprising a sleeve having a series of circumferentially arrayed ball-receiving apertures formed therein, a first group of said apertures having diameters sufficient to permit said balls to nest therein and a second group of said apertures having equal diameters but larger than said first group.

References Cited in the file of this patent

UNITED STATES PATENTS

| | | |
|---|---|---|
| 1,871,835 | Batchelder | Aug. 16, 1932 |
| 2,528,470 | Elder | Oct. 31, 1950 |

FOREIGN PATENTS

| | | |
|---|---|---|
| 52,181 | Sweden | June 22, 1917 |
| 95,797 | Austria | Jan. 25, 1924 |
| 636,682 | France | Apr. 16, 1928 |
| 164,383 | Austria | Nov. 10, 1949 |